United States Patent [19]

Ferguson et al.

[11] Patent Number: 4,573,114

[45] Date of Patent: Feb. 25, 1986

[54] VALVE CONTROL UNIT AND SYSTEM FOR USE THEREWITH

[75] Inventors: Gary L. Ferguson, Cedar Rapids; Carl H. Meier, Davenport, both of Iowa

[73] Assignee: Cherry-Burrell, Cedar Rapids, Iowa

[21] Appl. No.: 544,451

[22] Filed: Oct. 21, 1983

[51] Int. Cl.[4] .......................... G06F 15/46; G05B 15/02

[52] U.S. Cl. .......................... 364/138; 137/624.11; 137/487.5; 340/825.14; 364/167; 364/510

[58] Field of Search .............. 364/138, 139, 509, 510, 364/167; 137/624.11, 624.12, 624.15, 624.18, 624.19, 487.5; 340/870.11, 870.16, 870.28, 870.29, 825.06, 825.07, 825.14, 825.2, 825.21, 825.22, 825.54; 251/129, 131, 132

[56] References Cited

U.S. PATENT DOCUMENTS 3,875,955 4/1975 Gallatin et al. ................. 364/510 X
3,951,339 4/1976 Dufresne ....................... 137/487.5 X
4,082,942 4/1978 Tada et al. ..................... 364/139
4,149,237 4/1979 Freitas ......................... 364/138
4,156,112 5/1979 Moreland ....................... 179/15
4,217,647 8/1980 Sjoholm et al. ................. 364/510
4,277,832 7/1981 Wong ........................... 364/510
4;336,590 6/1982 Jacq et al. .................... 364/510 X

*Primary Examiner*—Joseph Ruggiero
*Attorney, Agent, or Firm*—Fitch, Even, Tabin & Flannery

[57] ABSTRACT

A valve control unit for use in a valve control system of the type wherein a plurality of valves each mounting a valve control unit are controlled by a remote controller and only a single electrical cable runs from the controller. Each control unit is adapted to transmit data as to the position of its valve and to receive data as to the desired position of its valve. The valve control unit comprises electronic circuit means for communicating with the controller, and first and second sensors. The first sensor provides a signal to the circuit means when the valve is in a first predetermined position. The second sensor provides a signal to the circuit means when the valve is in a second predetermined position. The electronic circuit means is adapted to report to the controller the condition of each of the sensors.

6 Claims, 10 Drawing Figures

VALVE CONTROL UNIT AND SYSTEM FOR USE THEREWITH

The invention relates to a control unit for operating valves and the like and, more specifically, to a valve control unit operated by a controller such as a computer and adapted to report the position of the controlled valve to the controller.

BACKGROUND OF THE INVENTION

Plants which handle liquids, such as breweries, dairies and soft drink producers, use pipe networks to transfer various liquids between locations. There is a need to stop or change the various liquid flows for mixing, cleaning or other reasons. This is often accomplished by the use of many switching valves disposed at strategic locations in the pipe networks. For example, a modern brewery might utilize numerous switching valves operated by a remote controller located, for example, in a control room.

Such valves typically are operated by a valve control unit which activates a solenoid for supplying air to a pneumatic cylinder, the ram of which directly switches the valve. It is common practice to hardwire each valve control unit to the controller. This requires the use of a great deal of material in terms of wire and conduit, and a large amount of skilled labor is required to complete the installation. Moreover, revisions and additions result in significant system downtimes and are also expensive in terms of labor and material.

A recently proposed valve control system uses valve control units carried by the air cylinder mounted on each valve. The various valve control units are connected by a common cable to the controller and the cable includes two conductors for transmitting a D.C. voltage superimposed on which is a modulated carrier frequency containing date from the controller for synchronization and valve switching while the valve control units supply data as to the condition of a contact at the valve control unit which is intended to represent the position of the valves. This is a type of frequency shift coding and is somewhat subject to interference which could cause unintended and erroneous valve operation. Furthermore, each valve control unit is required to include electronic circuitry for separating the D.C. voltage, for power, and the modulated carrier frequency for use with encoders, decoders and synchronizers. Reference may be made to U.S. Pat. No. 4,217,647 for a further description of the structure and operation of this system.

SUMMARY OF THE INVENTION

Among the several objects of the present invention may be noted the provision of an improved valve control unit and system for switching the position of a valve in a pipe network; the provision of such valve control unit and system which permits low cost installation, because less material and labor is required, and which permits fast and inexpensive system revision and additions; the provision of such valve control unit and system which is fast in operation and reports valve malfunction to a controller; the provision of such valve control unit and system which is relatively free of susceptibility to electrical interference which interference could result in erroneous or unintended valve operation; the provision of such valve control unit and system which can accommodate a great number of valves located at a relatively long distance from the controller; the provision of such valve control unit and system which directly monitors both the open and the closed position of each valve; and the provision of such valve control unit and system which is reliable in operation, has long service life and is simple and economical to manufacture. Other objects and advantages will be in part apparent and in part pointed out hereinafter in the specification and attached claims.

Briefly, the valve control unit of the present invention includes electronic circuit means for communicating with a controller. The unit further includes a first sensor at a monitored valve for providing a signal to the circuit means when the valve is in its first predetermined, e.g., open position. A second sensor is provided for signaling to the circuit means when the valve being monitored is in its second predetermined, e.g., closed position. The electronic circuit means is adapted to report to the controller the conditions of each of the sensors.

BRIEF DESCRIPTION OF THE DRAWINGS

Corresponding reference characters indicate corresponding components throughout the several views of the drawings.

BRIEF DESCRIPTION OF THE SOFTWARE

Figure 8:
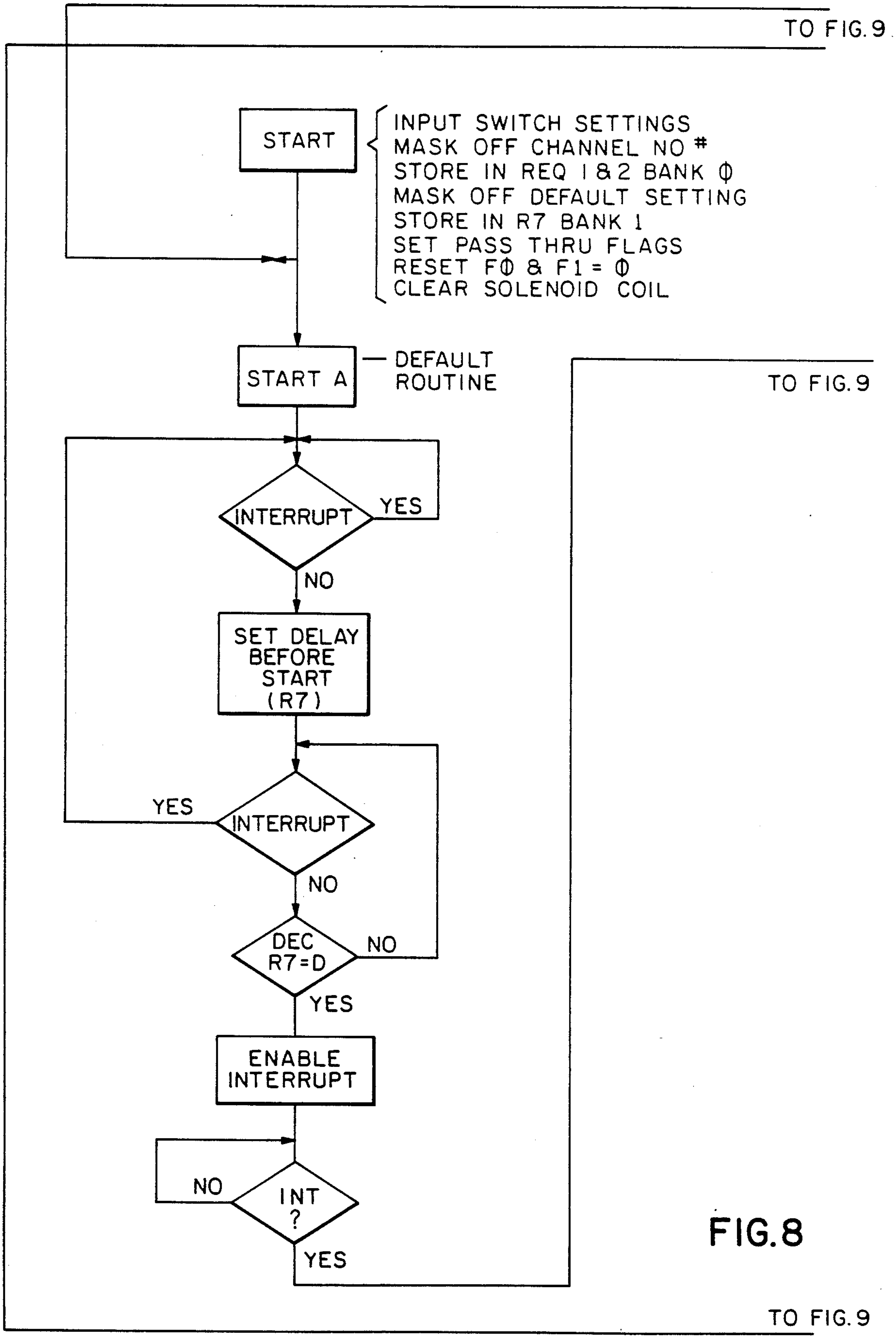
FIGS. 8, 9 and 10 are together a flow chart of a program for use with the valve control unit of the present invention.
Figure 9:
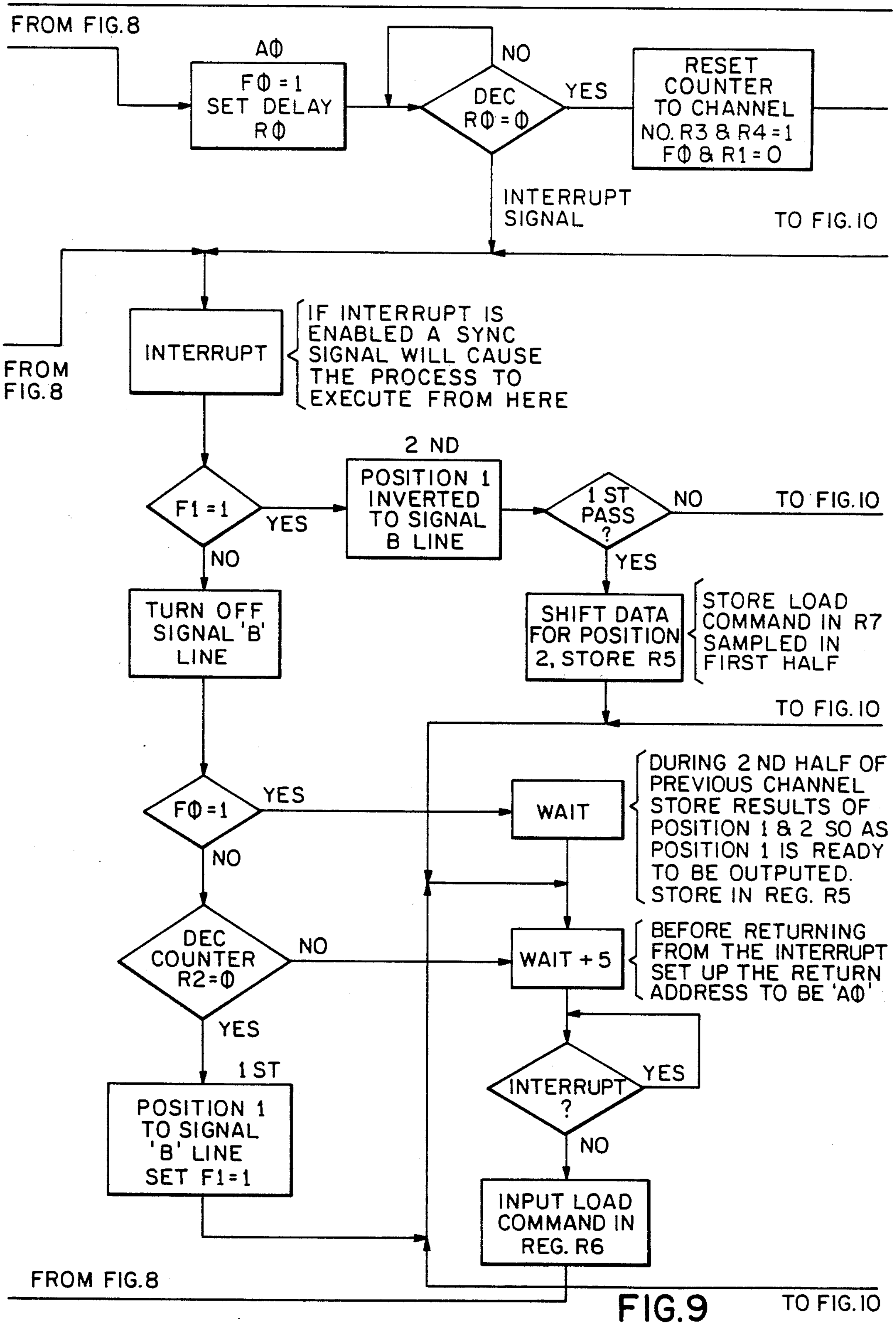
Figure 10:
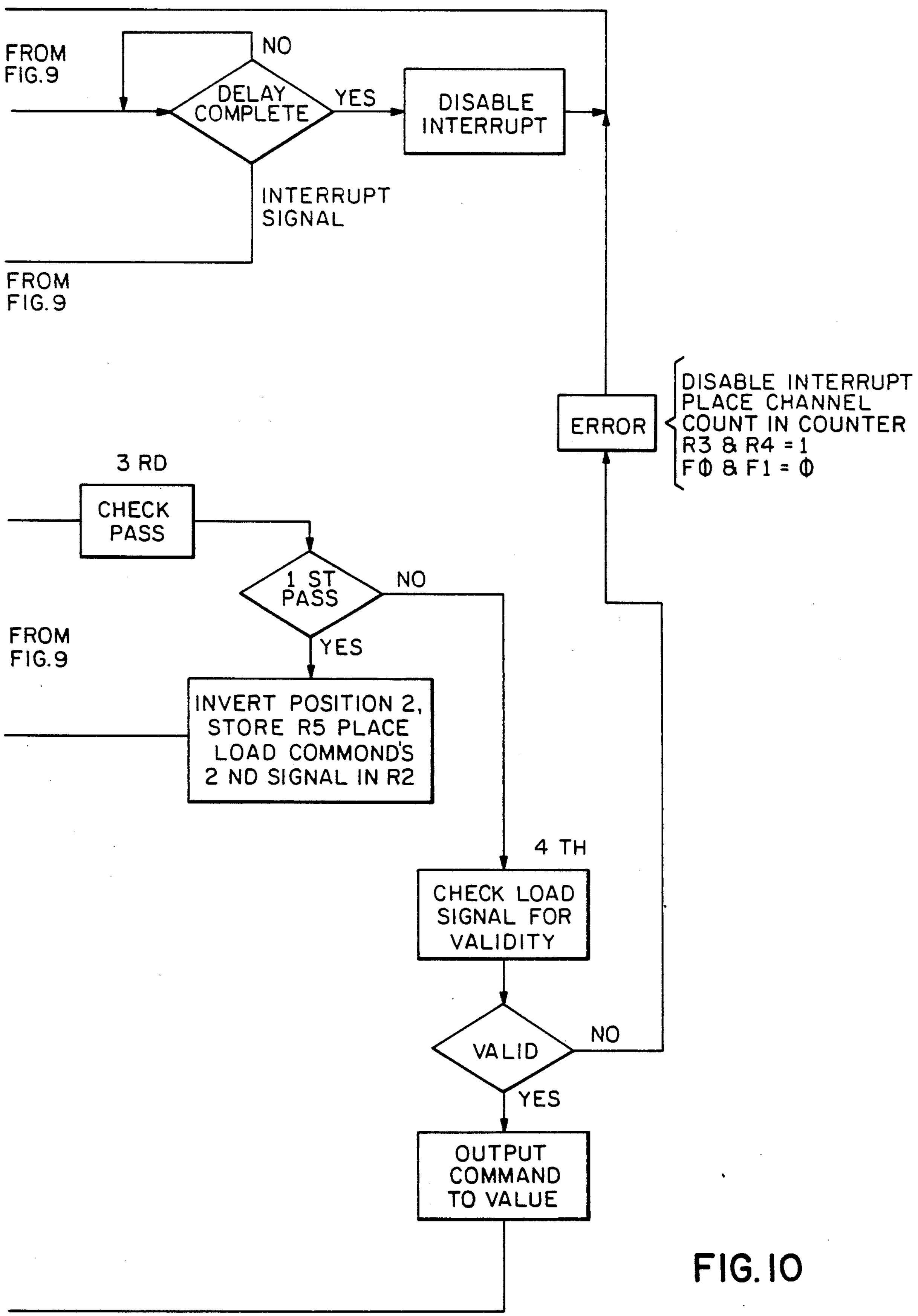

At the end of the specification is set forth a program, in machine language and of which FIGS. 8–10 are a flow chart, of the contents of a memory of a microprocessor included in the valve control unit of the present invention.

DESCRIPTION OF THE PREFERRED EMBODIMENT

Figure 1:
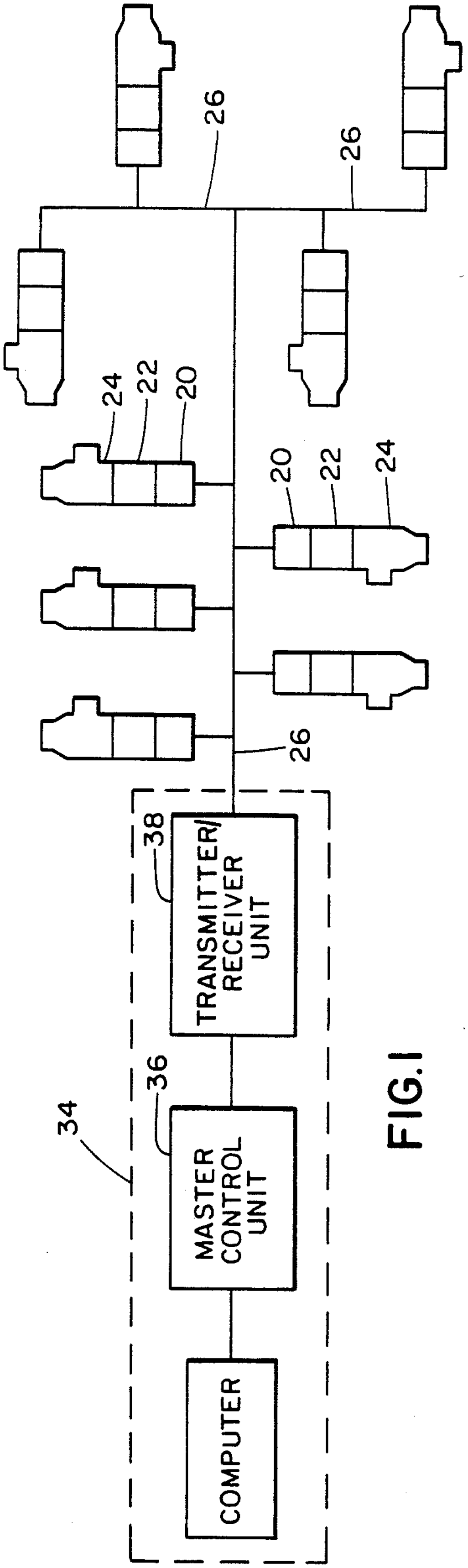
FIG. 1 is a simplified diagrammatic layout of a plurality of valves each carrying a valve control unit of the present invention with the units operated by a controller positioned remote from the valves.
Figure 2:
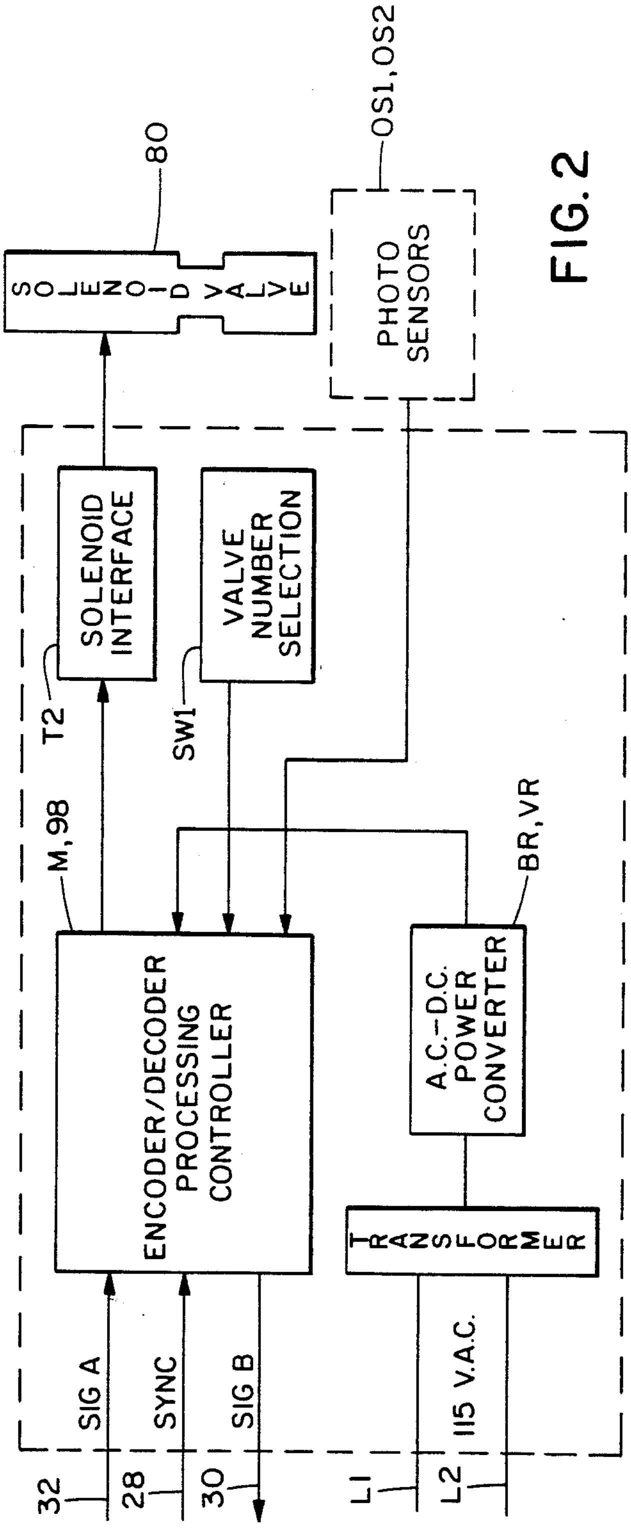
FIG. 2 is a block diagram representative of one of the valve control units of FIG. 1.

Referring now to the drawings, a valve control unit for operating a valve in accordance with instructions from a controller 34 and for reporting the position of its valve to the controller, is generally indicated by reference character 20. A valve control system incorporating valve control units 20 is shown in FIG. 1. Each unit 20 is carried by a pneumatic cylinder 22 which in turn is mounted upon the valve 24 which it shifts to control the valve. The various valve control units are all interconnected with a single cable 26 running from controller 34 located, for example, in a control room remote from the pipe network in which the valves are installed. The cable 26 is shielded and includes a pair of A.C. voltage power conductors L1, L2 and a trio of signal conductors 28, 30, 32 for carrying digital signals. Conductor 28 carries a synchronization signal while conductor 30 carries a "B" signal for reporting to the controller the status of each of the valves 24. Finally, conductor 32 carries an "A" signal emanating from the controller including intelligence directing the switching of the various valves. The cable may also include a common ground conductor 35 for all signal conductors, or the cable could include a separate ground conductor for each signal conductor.

The controller 34 preferably includes a computer, a master control unit 36 for providing a synchronization signal to maintain overall control timing and a transmitter/receiver unit 38 or input/output device for facilitating movement of the input/output data to the various valve control units. The controller 34 may also include a display panel or annunicator system (not shown) for displaying valve position and warning the attendant of malfunction. The master control unit 36 and the transmitter/receiver unit 38 are of the type commercially available from Control Junctions, Inc. of Schaumburg, Illinois. Furthermore, the control system and apparatus using time division multiplexing for generating a sychronization signal and a common signal are fully shown and described in U.S. Pat. No. 4,156,112, assigned to Control Junctions, Inc., the teachings of which are herein incorporated by reference.

By way of overview, each communication cycle established by the master control unit 36 is divided into a predetermined number of channels, e.g., 256, with each cycle divided into a first half and a second half marked by synchronization pulses from unit 36. Each valve control unit 20 is assigned a different adjacent pair of time channels; accordingly, this particular system can accommodate up to 128 valve control units. A high voltage or "1" in the first channel half followed by a low voltage or "0" in the second channel half is interpreted as an activation signal while "0" followed by a "1" is recognized as a deactivation signal. During the time interval provided by the first of the two channels associated with a particular valve control unit, the valve control unit transmits over the "B" signal conductor 30 telling the controller the status of one of a pair of valve position sensors while concurrently the controller effects a transmission over the "A" signal conductor 32 instructing the valve control unit the position in which the valve should be. During the time interval provided by the second channel associated with the particular valve control unit, data is transmitted from the valve control unit to the controller over the "B" line, informing the controller of the status of a second of a pair of valve position sensors. The controller does not send signals over the "A" line during the second time channel.

The communication cycle commences with an absence of pulses of two clock channel duration on the synchronization signal conductor 28. This cues each valve control unit that a communication cycle is commencing and to start counting time channels with the next synchronization pulse. Upon arrival of its assigned time channels, the particular valve control unit 20 is enabled to communicate with the controller 34.

For example, the valve control unit under consideration is assigned time channels 200 and 201. The controlled valve is deactivated causing the valve control unit 20 to generate the "0", "1" sequence. The controller determines that the valve should be activated and generates the "1", "0" sequence. When the synchronization signal conductor 28 has a period of two clock cycles with no pulses, each valve control unit is cued to reset and start counting. When time channel 200 arrives, the valve control unit is enabled to send data on the valve position over the "B" signal conductor, and receives instructions on the "A" signal conductor. During channel 200, the valve control unit transmits the "0", "1" sequence on the "B" signal conductor informing the controller that the first position sensor detects the valve is closed, and receives the "1", "0" sequence on the "A" signal conductor, being commanded to activate the valve. In channel 201, the valve control unit transmits the "0", "1" sequence indicating that the second position detector has also detected that the valve is closed. Of course, the valve switching is not instantaneous, and movement has not begun upon the arrival of channel 201.

Figure 4:
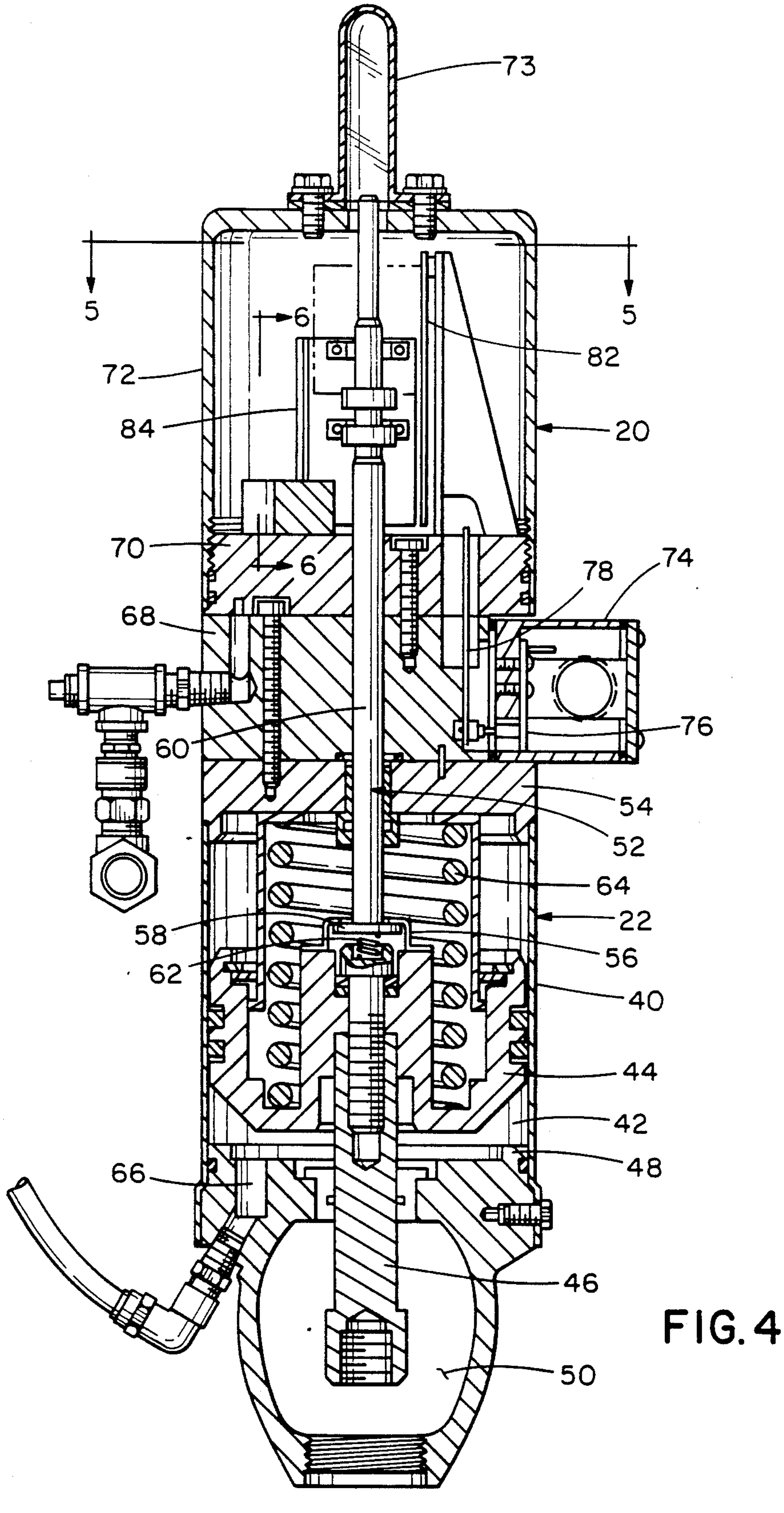
FIG. 4 is a sectional view of a pneumatic cylinder for attachment to the valve, the operation of the cylinder being controlled by a valve control unit of the present invention carried by the cylinder.

Referring to FIG. 4, pneumatic cylinder 22 includes a housing 40 defining a piston chamber 42 slidably holding a piston 44 having a rod 46 with a threaded end extending through a lower end wall 48 into a connection chamber 50. The chamber 50 is for reception of an operating stem (not shown) of a valve 24 for attachment of the internally threaded rod end. Extending oppositely from the piston rod 46 is an actuator rod 52 protruding slidably through an upper end wall 54 for indicating the piston position, and thus, the valve position. The rod 52 is attached to the piston by means of a retainer cup 56 holding an enlarged head 58 of the rod with the rod stem 60 extending through an opening in the cup of greater diameter than that of the stem. A compression spring 62 is disposed between the rod head and the piston body to secure the position of the rod while permitting alignment during assembly and operation.

The housing 40 also encloses a large compression spring 64, for working against upper end wall 54 and the piston 44, for biasing piston rod 46 to an extended position causing the valve to impede fluid flow through the valve. The lower end wall 48 has a port 66 for entrance of pressurized air. In the interest of brevity, pneumatic switching valves, the air supply and air supply connections and hardware are not fully shown as those are well known to those skilled in the art. Suffice it to say that application of pressurized air to piston chamber 42 through port 66 causes the piston rod 46 to move to a retracted position opening the valve 24 to fluid flow. The application of air also causes actuator rod 52 to extend through a base plate 68 attached to wall 54, a valve control unit mounting bracket 70 fastened to base plate 68, a valve control unit cover 72 held by the mounting bracket, and into a transparent indicator tube 73 for permitting visual observation of the position of the valve 24. On the other hand, exhaustion of port 66 results in the piston rod extending, under the bias of return spring 64, to close the valve 24. Also it causes the actuator rod 52 to retract.

Figure 3:
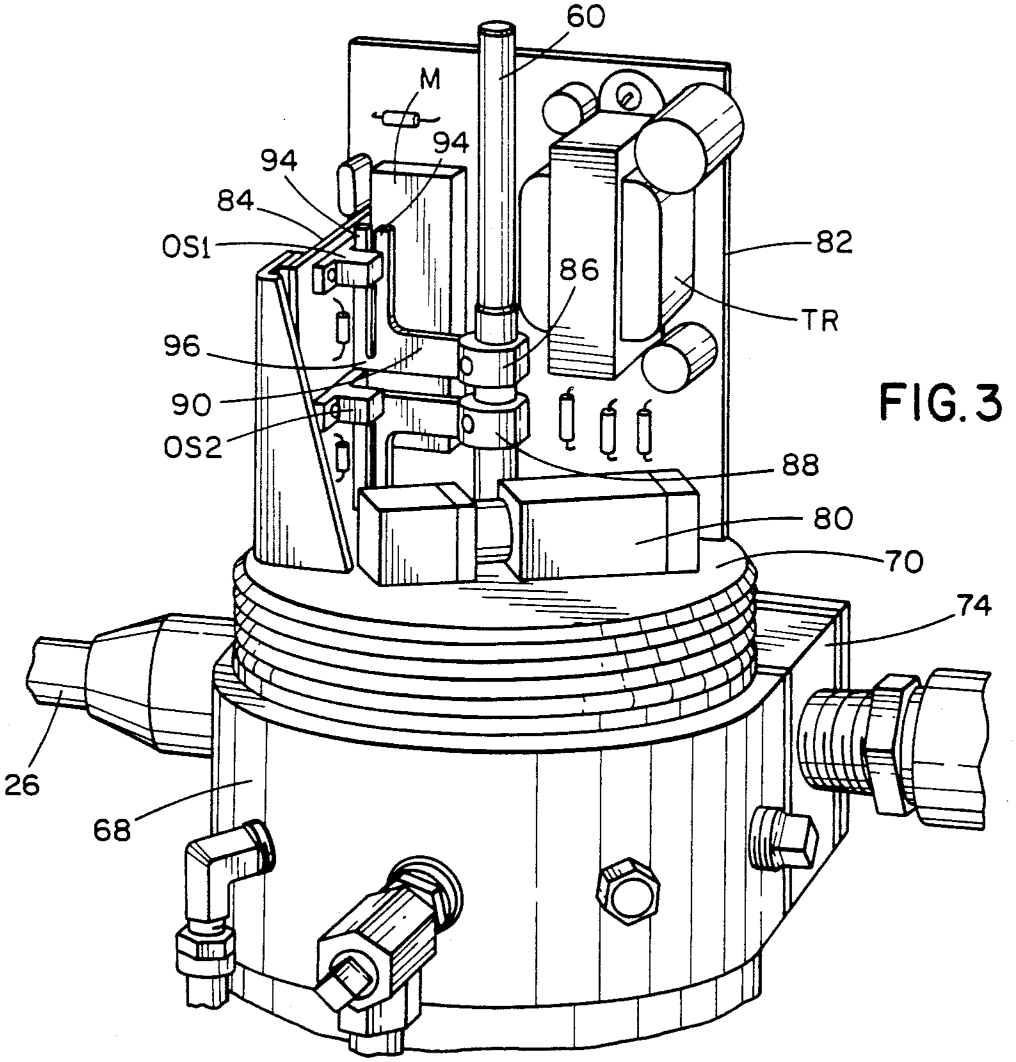
FIG. 3 is a perspective view of one of the valve units of FIG. 1 with certain components removed.

Besides mounting its valve control unit 20, the base plate 68 also supports a junction box 74 through which cable 26 passes. The junction box 74 encloses an external connection board 76 while mounted on base plate 68 in an internal connection board 78, with the boards 76, 78 interconnecting the cable 26 with the electrical and electronic components (which will be described more fully hereinafter) of the valve control unit 20. The valve control unit mounting bracket 70 supports a solenoid valve 80 (shown in FIGS. 3, 5 and 6) for switching the exhaustion/pressurization of cylinder 22, and electrical/electronic component mounting board 82 and a valve position sensor mounting board 84.

Figure 5:
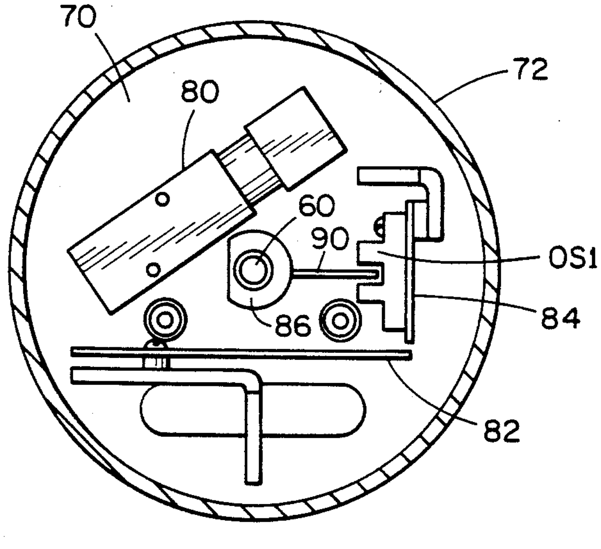
FIG. 5 is a sectional view taken generally along line 5—5 of FIG. 4 showing position sensor means of the valve control unit.
Figure 6:
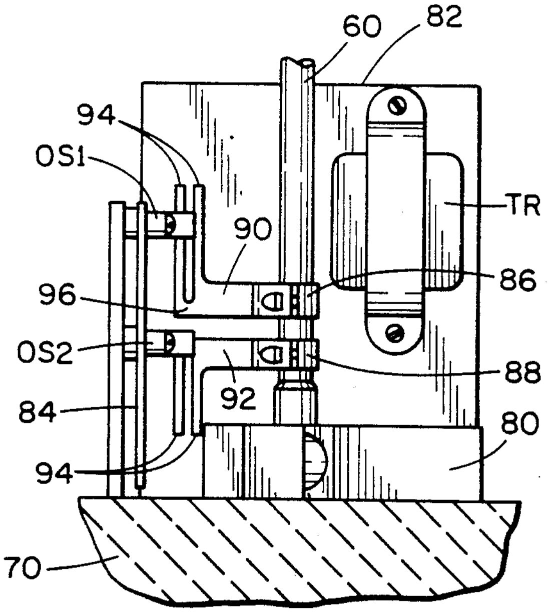
FIG. 6 is a sectional view taken generally along line 6—6 of FIG. 4 further illustrating the sensor means.

Adjustably attached at spaced positions on actuator rod 52 by means of collars 86, 88 are a pair of flags 90, 92. Each flag is bifurcated, including a pair of parallel guide legs 94 bridged by an interrupter 96 (as shown in FIG. 6) for blocking the radiation flow of an optionally coupled sensing device. More specifically, sensor mounting board 84 carries an upper optically coupled switch OS1 for providing data for transmission to the controller during the first time channel of the two time channels assigned to the particular valve control unit under consideration, on the "B" signal conductor 30, and a lower optically coupled switch OS2 for providing data for transmission to the controller during the second of the two time channels on the "B" signal conductor. They thus cooperate with the flags to indicate the position of actuator rod 52 (and thus indicate whether the valve is open or closed), as best shown in FIGS. 5 and 6. Each switch is identical so only switch OS1 need be described. It includes a light emitting diode LED1 for providing infrared radiation, and a phototransistor T1 spaced therefrom which is responsive to the impingement of radiation on its base to render conductive its collector-emitter circuit. Each flag interrupter 96 is movable between the diode and the transistor of its switch, and the collars 86, 88 and switches OS1, OS2 are positioned so that when the interrupter flag 90 is disposed between the components of switch OS1, the valve 24 is open while when the interrupter of lower flag 92 is between the components of switch OS2 (as shown in FIG. 6), the valve 24 is closed.

Figure 7:
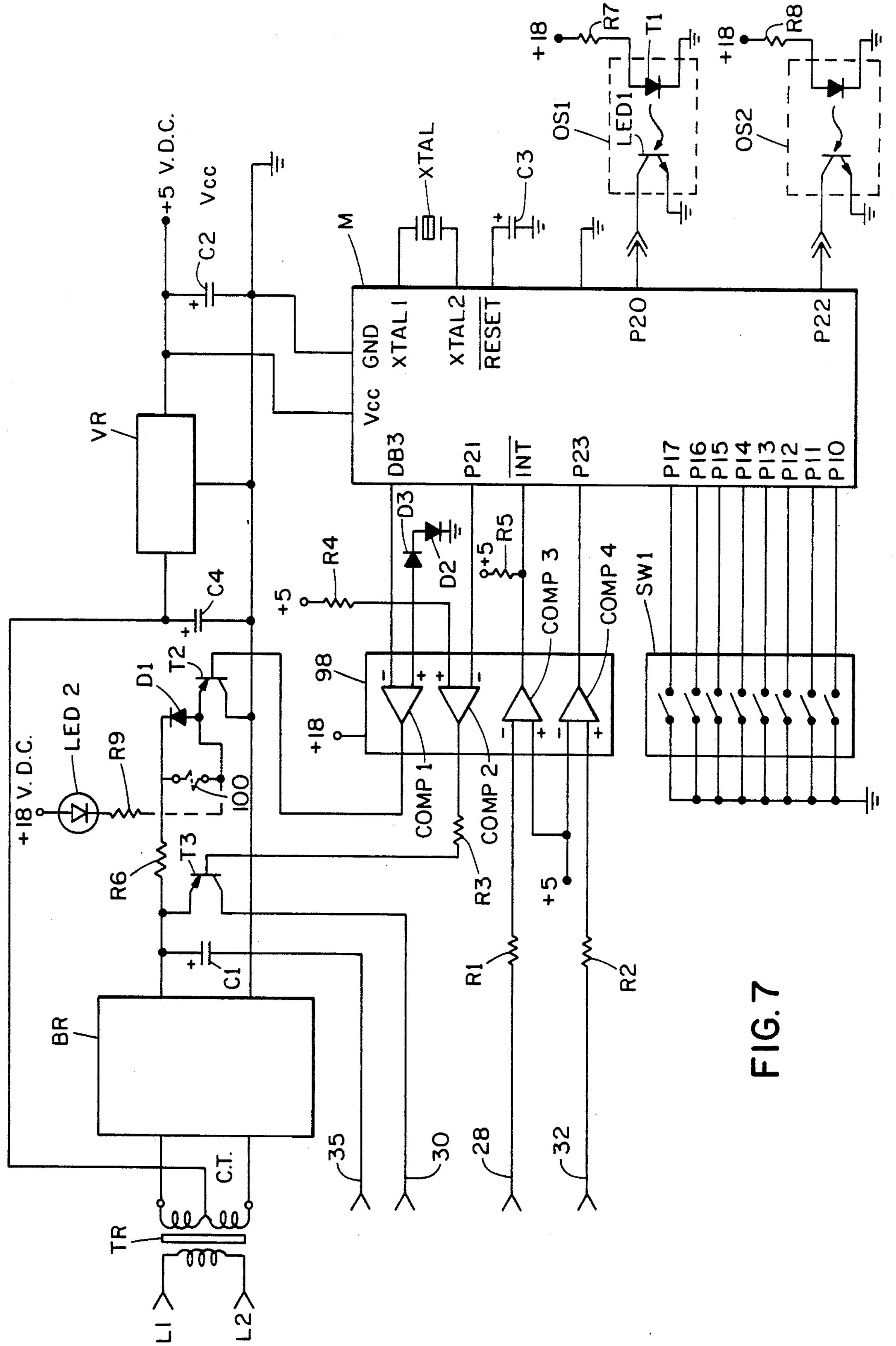
FIG. 7 is a schematic illustration of electrical and electronic components included in the valve control unit of the present invention.

The electrical/electronic components included in each valve control unit 20 are best shown in FIG. 7. Power leads L1, L2 are connected to the input of a center-tapped, step down transformer TR the output of which is rectified by a full wave bridge rectifier BR with a capacitor C1 connected across the output of the rectifier and acting as a filter to reduce D.C. ripple. The output thus provided is a nominal 18 volts D.C. for power usage. Interconnected with the transformer center tap and the grounded output of the rectifier are a ripple reduction capacitor C4 and the input of a voltage regulator VR for providing a regulated 5 volts D.C. output (VCC) for a control voltage for the electronic components. A voltage stabilization capacitor C2 is connected across the voltage regulator output and the negative output of the rectifier is grounded by virtue of its connection to common ground conductor 35 of cable 26. The transformer TR, rectifier BR, voltage regulator VR and associated capacitors can be considered to constitute a power supply for the valve control unit.

The heart of the valve control unit is a microprocessor M which includes encoder means, decoder means, memory, logic and clock means. Such a microprocessor is part number 8748 manufactured by Intel Corp., Santa Clara, Calif. This microprocessor includes a programmable read only memory (PROM) which is programmable to cause the microprocessor to respond to various sensors, switches and other inputs as will be described below. Connected to the microprocessor are the output of the voltage regulator and a crystal XTAL to establish, for example, a six megahertz clock rate for the microprocessor. Ports 20 and 22 are connected to ground through the collector-emitter circuits of the transistors of optically coupled switches OS1, OS2, respectively. The light emitting diode of each switch OS1, OS2 is connected from +18 volts D.C. to ground in series with a current limiting resistor R7, R8, respectively.

A dual in-line package (DIP) switch module SW1 has its eight outputs connected to a like number of ports of microprocessor M. Switch module SW1 comprises eight single pole, single throw switches, the inputs of which are grounded. Seven of the eight switches are used to fix the identity of the valve control unit with respect to its assigned channels in the communication cycle provided by master control unit 36. The position of the eighth switch identifies to the microprocessor that state that valve 24 is to go into if there is a signal line malfunction.

Interconnected with microprocessor M is a quad voltage comparator 98 comprising comparators COMP 1 through COMP 4. More specifically, a port DB3 of the microprocessor is connected to the negative input of COMP 1 while the positive input thereof (as well as the positive input of COMP 2) is commonly connected to VCC though a current limiting resistor R4 and to ground through serially connected diodes D3 and D2. The diodes provide a voltage drop so that the reference voltage at the positive input of COMP 1 and that of COMP 2 is about +1 volt D.C. The output of COMP 1 controls switching of a transistor T2, the collector-emitter circuit of which connects to ground from the +18 volts D.C. power voltage the parallel combination of the coil 100 of the solenoid valve 80 in series with resistor R6 and the series combination of a light emitting diode LED2 (for providing visual indication of solenoid coil energization) and a current limiting resistor R9. In order to protect transistor T2 from a deleterious voltage surge due to the collapse of the magnetic field of coil 100 upon turn off of transistor T2, a pull back diode D1 is provided in parallel with coil 100.

The negative input of comparator COMP 2 is connected to microprocessor port P21 while its output controls operation of a switching transistor T3 via current limiting resistor R3. The collector-emitter circuit of transistor T3 selectively connects +18 volt D.C. to the signal "B" conductor 30 of cable 26 in accordance with instructions from the microprocessor to report to the controller 34 the position of valve 24 as sensed by optically coupled sensor switches OS1 and OS2.

The synchronization signal conductor 28 of cable 26 is connected to the negative input of comparator COMP 3 through resistor R1 which provides a high impedance input. Both the positive input of comparator COMP 3 and the negative input of comparator COMP 4 are referenced to Vcc. The output of COMP 3 is connected to both Vcc through a current limiting resistor R5 and to the interrupt input INT of the microprocessor. Finally, the positive input of comparator COMP 4 is connnected to "A" signal conductor 32 of cable 26 through a current limiting resistor R2 and the output of COMP 4 goes to microprocessor M port P23. Of course, the general operation of the comparators is that if the voltage applied to the negative input is greater than that applied to the positive input, the output of the comparator will be a low voltage logic level. On the other hand, if the voltage at the negative input is equal to or lower than that at the positive input, a high voltage logic level will be present at the output of the comparator.

Operation of the electronic components of a representative valve control unit 20, as dictated in part by the contents of the PROM of the microprocessor, is as follows: Assume that the valve control unit under consideration is number 100 and that the various switches of DIP switch module SW1 have been set accordingly to enable the microprocessor M to receive and transmit data during channels 200 and 201. Furthermore, assume that the piston rod 46 of a cylinder 22 is retracted so that valve 24 is open, and that actuator rod 52 is extended causing optically coupled switch OS1 to disconnect the port P20 of the microprocessor from ground and causing the phototransistor of switch OS2 to conduct thus connecting microprocessor port P22 to ground. Upon the absence of pulses on the synchronization signal conductor 28 for a predetermined time, e.g., of a duration of two clock channels, comparator COMP 3 provides a high output of sufficient duration to the INT input of the microprocessor cueing it to start counting with the next synchronization pulse.

Communications between the valve control unit 20 designated 100 and the controller 34 begin with the start of channel 200 of the communication cycle and end at the expiration of channel 201. Upon arrival of channel 200, microprocessor output P21 provides a low output during the first channel half and a high output (5 volts) during the second channel half. This results in comparator COMP 1, which acts as a buffer, controlling the switching of PNP transistor T3 so that the "1", "0" sequence is applied to signal "B" conductor 30 informing the controller that sensor switch OS1 has sensed that its valve 24 is open. Also during channel 200, the "0", "1" sequence is provided on signal "A" conductor 32. As the "high" on this conductor exceeds +5 volts, comparator COMP 4 passes the "0", "1" sequence to the microprocessor commanding that valve 24 be deactivated or closed. In response, the microprocessor changes the output of DB3 causing transistor T2 to be rendered non-conductive thus deenergizing the solenoid coil 100 resulting in exhaustion of piston chamber 42 to permit biasing spring 64 to extend piston rod 46 to close the valve 24. Of course, valve switching cannot occur instantaneously. Upon the arrival of time channel 201 of the communication cycle, valve 24 is still open and this is reported to the microprocessor by switch OS2. The microprocessor is responsive to generate at output P21 a low output during the first half of channel 201 and high output during the second channel half. This again results in the comparator COMP 1 controlling transistor T3 so that the "1", "0" sequence is applied to signal "B" conductor 30 informing the controller that switch OS2 has determined that its valve 24 is open. Upon arrival of time channel 202, communication between the valve control unit designated 100 and the controller 34 is disabled and is not again enabled until the arrival of channel 200 of the next communication cycle.

The values of the various resistors (in ohms) and capacitors (in microfarads) are as follows: R1=1M, R2=1M, R3=1K, R4=10K, R5=10K, R6=100, R7=3.3K, R8=3.3K, R9=1K, C1=470, C2=1.5, C4=1000.

The attached program and FIGS. 8–10 regard the contents of the PROM of microprocessor M.

In view of the above, it will be seen that the several objects of the invention are achieved and other advantageous results attained.

As various changes coudl be made without departing from the scope of the invention, it is intended that all matter contained in the above description shall be interpreted as illustrative and not in a limiting sense.

```
CBVALVE4  SOFTWARE FOR PROTOTYPE BOARD

8-07-83  IF AN ERROR IS DETECTED IN THE TRANSMISSION LINE; NO TRANSMISSION
         OR THAT CHANNEL IS NOT TRANSMITTING, DRIVE THE LOAD TO THE DEFAULT
         MODE. 074 -- C6,F5   JZ ERROR  SENDS THE CONTROLS TO THE ERROR
         ROUTINE.


CHERRY BURRELL CONTROL VALVE


   PIN ASSIGNMENTS:

   DEFAULT SETTING  OFF=LAST STATE   ON=LOAD OFF        P10
   ADDRESS 1                                            P11
   ADDRESS 2                                            P12
   ADDRESS 4                                            P13
   ADDRESS 8                                            P14
   ADDRESS 16                                           P15
   ADDRESS 32                                           P16
   ADDRESS 64                                           P17

   POSITION 1 SENSOR                                    P20
   SIGNAL B OUTPUT LINE                                 P21
   POSITION 2 SENSOR                                    P22
   SIGNAL A INPUT LINE                                  P23

   SOLENOID COIL                                        DB3

1238HH:HH8912345689123491231234569T
1   1       1       1     1           11111111
            1       1     1           111111
```

THE SIGNAL LINE FROM THE MASTER MUST BE INVERTED AND TIED TO THE INTERRUPT PIN OF THE 8748.

```
000 04,C0            JMP   START
.
.
003 76,30            JF1   2ND         WITHIN THE CHANNEL
005 9A,0D            ANL   P2,0DH      TURN OFF SIGNAL B
007 B6,80            JF0   WAIT        2ND HALF OF THE CHANNEL
009 EA,85            DJNZ R2,WAIT+5 IS THIS THE CHANNEL?
.   .
00B FD       1ST     MOV   A,R5        THIS IS THE CHANNEL
00C 3A               OUTL  P2,A        SEND SIGNAL TO SIGNAL B LINE
00D 37               CPL   A           INVERT SIGNAL FOR NEXT PASS
00E AD               MOV   R5,A        STORE IN R5 LOCATION
00F B5               CPL   F1          SET THE CHANNEL FLAG
010 04,85            JMP   WAIT+5      JMP TO THE WAIT PROGRAM
030 FD       2ND     MOV   A,R5        POSITION SIGNAL STORED IN R5
031 3A               OUTL  P2,A        SIGNAL TO SIGNAL B LINE
032 EC,50            DJNZ  R4,3RD      CHECK TO SEE IF FIRST PASS THRU
034 77               RR    A           SHIFT POSITION DATA TO POSITION 2
035 77               RR    A           SHIFT 2 PLACES
036 37               CPL   A           INVERT TO ORIGINAL SIGNAL
037 AD               MOV   R5,A        STORE IN R5
038 FE               MOV   A,R6        TAKE SIGNAL A DATA SAMPLED IN 1ST HALF
039 AF               MOV   R7,A        STORE IN R7
03A 04,85            JMP   WAIT+5      JMP TO THE WAIT PROGRAM
.
.
050 EB 70    3RD     DJNZ  R3,4TH      CHECK TO SEE IF FIRST PASS THRU
052 FD               MOV   A,R5        POSITION 2 SIGNAL
053 37               CPL   A           INVERT SIGNAL
054 AD               MOV   R5,A        STORE INVERTED POSITION 2 IN R5
055 FE               MOV   A,R6        TAKE SIGNAL A DATA SAMPLED IN 2ND HALF
056 AA               MOV   R2,A        STORE IN R2
057 04,85            JMP   WAIT+5      JMP TO THE WAIT PROGRAM
.
.
070 FF       4TH     MOV   A,R7        CHECKING LOAD SIGNAL IN R7
071 DA               XRL   A,R2        WITH THE INVERTED SIGNAL IN R2
072 53,08            ANL   A,08        MASK OFF ALL BITES EXCEPT BIT 3
074 06-F5            JZ    ERROR       ERROR IN DATA IF ZERO - JMP TO ERROR
076 FF               MOV   A,R7        OTHERWISE SET THE OUTPUT
077 02               OUTL  BUSS,A      TO THE CONTROL SIGNAL A
078 A5               CLR   F1          CLEAR F1 FLAG
079 BA-00            MOV   R2,00H      RETORE R2 TO ZERO
07B 04-85            JMP   WAIT+5      JMP TO THE WAIT PROGRAM
.
080 9A-FD    WAIT    ORL   P2,0FDH     DURING 2ND HALF OF PREVIOUS CHANNELS
082 0A               IN    A,P2        STORE THE POSITIONS 1 & 2
083 E7               RL    A           SO AS POSITION 1 IS READY TO BE OUTPUTED
084 AD               MOV   R5,A        STORED IN REG. R5
.
085 B8,08    WAIT+5  MOV   Ro,08H      BEFORE RETURNING FROM THE INTERRUPT
087 23,A0            MOV   A,0A0H      SET UP THE RETURN ADDRESS TO BE 'A0'
089 A0               MOV   @Ro,A       SO AS TO RETURN TO ADDRESS LOCATION '08F
08A 86,8A            JNI   $+0         HOLD THIS LOCATION UNTIL THE INTERRUPT IS HIGH
08C 8A,08            ORL   P2,08H      SET P23 INPUT
08E 0A               IN    A,P2        ALWAYS INPUT THE LOAD COMMAND WHEN INTERRUPT
08F AE               MOV   R6,A        IS REMOVED AND STORE IN REG. R6
090 93              .RETR              RETURN FROM INTERRUPT
.
.
.   .   .
.
0A0 95               CPL   F0          COMPLIMENT F0 TO SKIP 2ND HALF OF A COUNT
0A1 B8,20            MOV   R0,20H      NUMBER OF DELAYS BEFORE RESETING THE COUNTER
0A3 E8-A3            DJNZ  R0,$+0      LOOP ON ITSELF
```

BEST AVAILABLE COPY

```
. IF THE PROGRAM GETS THIS FAR, THEN THE DEVICE IS TO BE RESET
.
0A5 F9             MOV  A,R1       LOAD A WITH REG. 1
0A6 AA             MOV  R2,A       RESET COUNTER R2 WITH R1
0A7 BB,01          MOV  R3,01      SET PASS THRU TRAPS
0A9 BC,01          MOV  R4,01      SET PASS THRU TRAPS
0AB A5             CLR  F1         RESET F1
0AC 85             CLR  F0         RESET F0
.
0AD BF,4C          MOV  R7,04CH    NUMBER OF DELAYS BEFORE RESETING THE LOAD
0AF B8,FF          MOV  R0,0FFH    NUMBER OF DELAYS BEFORE RESETING THE LOAD
0B1 E8,B1          DJNZ R0,$+0
0B3 EF,AF          DJNZ R7,$-4
.
. IF THE PROGRAM GETS THIS FAR, THEN THE DEVICE IS OFF LINE
.
0B5 15             DIS  I          DISABLE THE INTERRUPTS
0B6 04,DF          JMP  STARTA
.
.
.
0C0 09      START  IN   A,P1       INPUT THE SWITCH SETTINGS
0C1 53,FE          ANL  A,FE       MASK OFF ALL BUT THE CHANNEL NUMBER
0C3 17             INC  A
0C4 A9             MOV  R1,A       STORE IN REG. 1
0C5 AA             MOV  R2,A       STORE IN REG. 2 FOR CHANNEL COUNT
.
0C6 09             IN   A,P1       INPUT OF SWITCH SETTINGS
0C7 00             NOP
0C8 00             NOP
0C9 00             NOP
0CA 53,01          ANL  A,01       MASK OFF ALL BUT THE DEFAULT SETTING
0CC D5             SEL  RB1        REG.BANK 1
0CD AF             MOV  R7,A       STORE DEFAULT SETTING IN REG.7
0CE C5             SEL  RB0        REG.BANK 0
.
0CF BB,01          MOV  R3,01      SET PASS THRU TRAPS
0D1 BC,01          MOV  R4,01      SET PASS THRU TRAPS
0D3 A5             CLR  F1         RESET F1 FLAG
0D4 85             CLR  F0         RESET F0 FLAG
0D5 27             CLR  A
0D6 02             OUTL BUS,A
.
.
0DF D5      STARTA SEL  RB1        SELECT REG. BANK 1
0E0 FF             MOV  A,R7
0E1 96,E4          JNZ  $+3
0E3 02             OUTL BUS,A
0E4 C5             SEL  RB0        SELECT REG. BANK 0
0E5 9A,FD          ANL  P2,0FDH    SET THE INPUT LINES
.
0E7 86,E7          JNI  $+0        WAIT FOR THE REMOVAL OF THE INTERRUPT
0E9 BF,18          MOV  R7,18H     NUMBER OF DELAYS BEFORE START
0EB 86,E7          JNI  $-4        LOOKING FOR THE RESET SIGNAL
0ED EF,EB          DJNZ R7,$-2
0EF 05             EN   I          ENABLE INTERRUPTS
0F0 04,F0          JMP  $+0        LOOP ON ONESELF
.
.
. 9-02-83 TESTING THE CJ MODULES SHOWED THAT IF THE 'COM' LINE IS HIGH
.         OR LOW, THE UNIT DEFAULTS. THEREFORE: 074 -- C6,F5   JZ ERROR
.
0F5 15      ERROR  DIS  I
0F6 F9             MOV  A,R1
0F7 AA             MOV  R2,A
0F8 BB,01          MOV  R3,01
0FA BC,01          MOV  R4,01
0FC A5             CLR  F1
0FD 85             CLR  F0
0FE 04,DF          JMP  STARTA
.
.
END
```

What is claimed is:

1. A plurality of valve control units each adapted to be carried by a valve which is movable between a first predetermined position and a second predetermined position for controlling operation of its corresponding valve in accordance with instructions from a controller remote from said valves and reporting to said controller the position of its valve, each valve control unit comprising:

connector means for making connection with a cable interconnected with said controller, said cable including a pair of conductors for carrying an A.C. voltage, a conductor for carrying a digital synchronization signal generated by said controller, a conductor for carrying a digital command signal generated by said controller, and a conductor for carrying a digital position indication signal generated by said control units;

sensor means for detecting the position of the valve;

solenoid means for causing movement of the valve;

microprocessor means responsive to said synchronization signal and said command signal to effect energization and deenergization of said solenoid means, said microprocessor being responsive to said sensor means to contribute to said position indication signal; and power supply means connected to receive said A.C. voltage and providing a first D.C. voltage for energizing said solenoid means and a second D.C. voltage for providing a control voltage for said microprocessor means.

2. A plurality of valve control unit as set forth in claim 1 wherein the sensor means of each valve control unit comprises a first optical limit switch for detecting the position of the valve and a second optical limit switch for detecting the position of the valve.

3. A plurality of valve control units as set forth in claim 1 wherein said cable includes a common ground conductor for the three signal conductors.

4. An improvement is a valve control system of the type comprising a controller for controlling operation of a plurality of fluid flow valves disposed remote from said controller, each valve carrying a valve control unit therefor with each unit including transmitting means for signaling said controller as to the position of its valve and receiver means for receiving directions from said controller as to the desired position of each valve, said improvement comprising a common cable interconnecting each of said valve control units with said controller including:

a pair of power conductors for carrying alternating current voltage to each actuator;

a synchronization signal conductor for carrying a digital synchronization signal;

a position indication signal conductor for carrying a digital signal from each of said transmitter means to said controller;

a position command signal conductor for carrying a digital signal from said controller to each of said receiver means; and signal conductor ground means, at least one of said valve control units being adapted to transmit data concurrently over said position indication signal while said controller is transmitting data over said position command signal conductor.

5. An improvement as set forth in claim 4 wherein said signal conductor ground means comprises a common ground return conductor for all of the aforementioned signal conductors.

6. An improvement as set forth in claim 4 wherein said signal conductor ground means comprises a discrete ground return conductor for each of said signal conductors.

* * * * *

UNITED STATES PATENT AND TRADEMARK OFFICE
CERTIFICATE OF CORRECTION

PATENT NO. : 4,573,114

DATED : February 25, 1986

INVENTOR(S) : Gary L. Ferguson et al.

It is certified that error appears in the above-identified patent and that said Letters Patent is hereby corrected as shown below:

Column 1, line 38, change "date" to --data--.
Column 3, line 28, change "common" to --command--.
Column 4, line 28, change "of" to --to--.
Column 4, line 66, change "in" to --is--.
Column 5, line 11, change "optionally" to --optically--.
Column 5, line 32, after "interrupter" insert --of--.
Column 5, line 62, change "programmable" to --programmed--.
Column 6, line 16, first instance, change "that" to --the--.
Column 6, line 24, change "though" to --through--.
Column 8, line 26, after "C2=1.5," insert --C3=1.5,--.
Column 8, line 33, change "coudl" to --could--.
Column 13, line 34, change "unit" to --units--.
Column 14, line 4, change "is" to --in--.

Signed and Sealed this

*Second* Day of *September 1986*

[SEAL]

*Attest:*

DONALD J. QUIGG

*Attesting Officer* *Commissioner of Patents and Trademarks*